United States Patent [19]

Messiou et al.

[11] Patent Number: 4,933,560

[45] Date of Patent: Jun. 12, 1990

[54] PYROELECTRIC INFRARED SENSORS

[75] Inventors: Antoine Y. Messiou; Michael R. Josey, both of Southampton, England

[73] Assignee: U.S. Philips Corp., New York, N.Y.

[21] Appl. No.: 281,291

[22] Filed: Dec. 7, 1988

[30] Foreign Application Priority Data

Dec. 18, 1987 [GB] United Kingdom ................. 8729514

[51] Int. Cl.⁵ ................................................ G01V 9/04

[52] U.S. Cl. ..................................... 250/353; 250/342

[58] Field of Search ................ 250/353, 342; 340/567, 340/600

[56] References Cited

U.S. PATENT DOCUMENTS

| | | | |
|---|---|---|---|
| 3,792,275 | 2/1974 | Leftwich et al. | 250/342 |
| 4,429,223 | 1/1984 | Wägli | 250/342 |
| 4,717,821 | 1/1988 | Messiou | 250/221 |

FOREIGN PATENT DOCUMENTS

| | | | |
|---|---|---|---|
| 0151576 | 8/1985 | Japan | 250/221 |
| 1551541 | 8/1979 | United Kingdom | 250/342 |

*Primary Examiner*—Janice A. Howell
*Assistant Examiner*—Richard Hanig
*Attorney, Agent, or Firm*—William L. Botjer

[57] ABSTRACT

An infrared radiation sensor is provided comprising an infrared optical system and a pyroelectric radiation detector for receiving infrared radiation from the optical system and generating an output signal. The optical system has a lens (6) arranged to feed source radiation through an aperture (9) into a reflective radiation cavity (10), the lens and the aperture defining a radiation sensitive angular zone width and direction (2,3,4,5) for the sensor. The pyroelectric radiation detector comprises a film (11) of pyroelectric plastics material within the cavity. The film area can be made large within the cavity without affecting the angular resolution of the sensor which is controlled by the ratio of the optical system focal length to the aperture width.

7 Claims, 1 Drawing Sheet

PYROELECTRIC INFRARED SENSORS

BACKGROUND OF THE INVENTION

This invention relates to infrared sensors which may be used for automatic light switching or for intruder detection by sensing the thermal infrared radiation emitted by a human being in the vicinity of the sensor. In particular it relates to an infrared sensor comprising an optical system for gathering and concentrating infrared radiation from a source and a pyroelectric radiation detector for receiving the infrared radiation and generating an output signal. Such sensors usually comprise an array of lenses for directing and concentrating radiation from a plurality of arcuately displaced directions onto a detector.

In European Patent Application No. 0,197,583 A1 which corresponds to U.S. Pat. No. 4,717,821 an array of fresnel lenses, moulded in planar form, is described for use in an infrared intruder alarm. The passage of an intruder across any one of the arcuately displaced directions generates a signal in a detector placed to receive the image of the intruder focused by the associated lens. Each direction is defined by the line joining the detector to the pole of the associated lens. The angular width of the radiation sensitive zone associated with each of the directions is defined by the ratio of the detector width seen from that direction to the focal length of the associated lens. To match likely source outlines for effective sensing the detector shape and dimensions are required to bear a definite relationship to lens focal length. With a typical detector area of 2 mm×1 mm, a focal length of 30 mm would be optimum.

SUMMARY OF THE INVENTION

However, it is desirable that the sensor, when installed in a location to be protected, should be unobtrusive but should not require to be recessed into a wall or ceiling to achieve this. A sensor with the external appearance of a flat plate is desirable. It is an object of the invention to provide such a sensor. Accordingly, the invention provides an infrared radiation sensor comprising an optical system for gathering and concentrating infrared radiation from a source and a pyroelectric radiation detector for receiving the infrared radiation and generating an output signal, characterised in that the optical system comprises a lens arranged to feed source radiation through an aperture into a reflective radiation cavity, the lens and the aperture defining a radiation sensitive angular zone width and direction for the sensor, and in that the pyroelectric radiation detector comprises a film of pyroelectric plastics material within the cavity. The previously necessary connection between the optical system focal length, the detector area and the sensitive zone angular width is now removed. The zone angular width is now defined by the ratio of the size of the aperture to the focal length. By using aperture areas smaller than the known detector areas, smaller focal lengths can be used and the overall depth of the sensor reduced to a more plate-like dimension. Also, since the aperture can be small, the amount of radiation lost from the radiation cavity back out through the aperture is reduced. Further, the area of the film detector material can be made larger than that of conventional detectors. This achieves good radiation absorption. Also, a large enough value of the electrical capacity between electrodes on either side of the film can be obtained, in spite of the low dielectric constant of such film, to achieve low shot noise in the following amplifier. The zone direction is defined by the line joining the centre of the aperture to the pole of the lens. The detector film may be integral with the cavity and may form one wall of the cavity.

The invention may be characterised in that the optical system comprises an internally reflecting tapered cone, in that the lens is placed across the large end of the cone, and in that the small end of the cone forms the aperture into the cavity. The aberrations of the lens, especially if it is used off-axis in the optical system, spread the geometrical image of the source provided by the lens. With the reflective cone this spread radiation is reflected through the aperture and the radiation loss avoided with only a small increase in the angular width of radiation sensitive zone. In this case the zone angular width is determined by the ratio of the aperture width to the lens diameter.

The invention may be characterised in that a plurality of optical systems are provided, and in that each optical system feeds source radiation through a respective aperture into the cavity. Further, the sensitive directions of the optical systems may then form an angularly dispersed fan of directions. An intruder crossing the zones in succession then produces an alternating signal output from the detector.

For economy in production, the sensor may be characterised in that the tapered cone and cavity are formed as a length of an extrusion whereby the cone and cavity cross sections are constant throughout the extrusion length, in that the optical system is a cylindrical lens, the cylinder axis of the lens being parallel to the extrusion length, and in that the ends of the extrusion length are closed by reflecting material to complete the cavity. The lens is then a strip and the aperture is a slit parallel to the extrusion length. The cylindrical lens may then be a Fresnel lens which may be extruded as part of an integral window closing the large end of the cone. In this case the pole of the lens takes the form of a line, the lens cylindrical axis, the aperture slit and pole line defining a radiation sensitive plane.

BRIEF DESCRIPTION OF THE DRAWINGS

Embodiments of the invention will now be described, by way of example, with reference to the accompanying drawings, in which.

DETAILED DESCRIPTION OF THE PREFERRED EMBODIMENT

Figure 1:
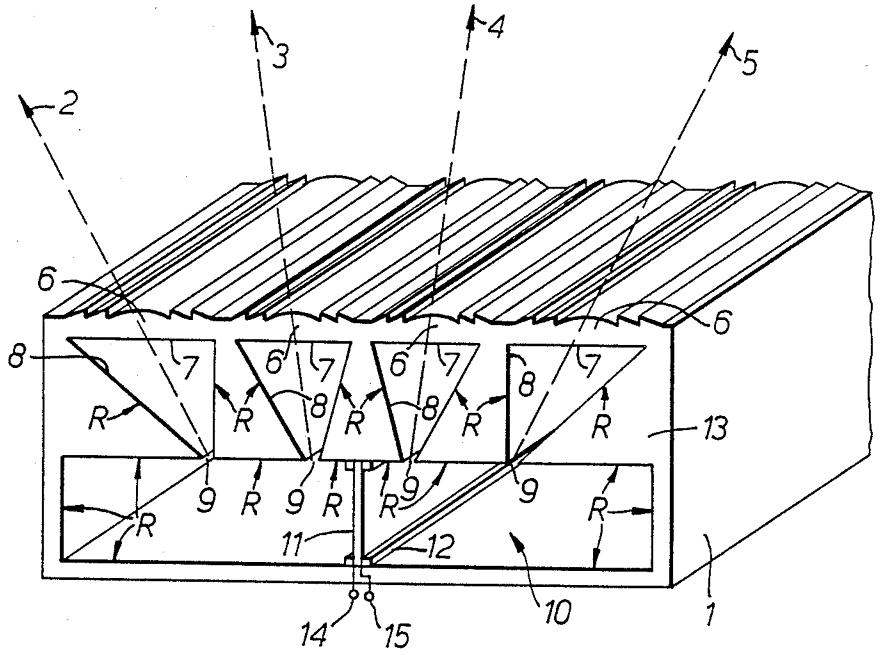
FIG. 1 shows a schematic perspective view of a planar form of an infrared sensor according to the invention.

Referring to FIG. 1, an infrared radiation sensor is shown in which the body 1 of the sensor is formed as an extrusion having a constant cross-section throughout its length. In this example, the sensor has four radiation sensitive zones forming an angularly dispersed fan of four directions 2, 3, 4 and 5. Each sensitive direction has an optical system for gathering and concentrating infrared radiation from a distant source (not shown). The optical system for each direction includes a cylindrical Fresnel lens 6, the cylinder axis of the lens being parallel to the extrusion direction. Each lens may be formed in the extrusion process or may be formed separately and bonded to a clear window 7 forming part of the extrusion. Beneath each lens a cone 8 in strip or wedge form is provided by the extrusion process. The large end of the cone is closed by the window 7, the small end of the cone defining an aperture 9 of slit form near the focal plane of the lens. The planar walls of the cone carry a specularly reflecting layer R.

The radiation sensitive direction of each optical system in the plane of the drawing is defined by the line joining the centre of the associated lens to the centre of the width of the respective aperture 9. Since the centre, or pole, of the cylindrical lens is a line and since the aperture is a slit parallel to the lens cylinder axis, the sensitive direction of each lens is a plane normal to the plane of the drawing which therefore defines a linear zone in the distant field of view. The angular width of each radiation sensitive zone is defined by the aperture width in the plane of the drawing divided by the diameter of the lens. In a typical example the gaps may be 0.25 mm wide and the lenses, which may be F/1.0, may be of 6 mm diameter providing a nominal zone width of 42 milliradians. This may be compared with a conventional arrangement comprising a pyroelectric detector having a 2 mm width sensitive area used with a lens of focal length 30 mm, providing a nominal zone width of 67 milliradians. There is therefore a reduction in focal length by a factor of five and a corresponding reduction in overall depth of the sensor. The cylindrical Fresnel lens will have aberrations since its relative aperture will be as wide as possible, i.e. the lens F No. will be as small as possible, typically F/1.5 or less. The aberrations will be more pronounced if a lens is used off-axis, as is the case with directions 2 and 5 in FIG. 1. The aberrated radiation falls on the reflecting layer R just inside the small end of the cone and a substantial part of the aberrated radiation will be reflected through the aperture 9 and is not lost. The ratio between the width of the large end of the cone and the aperture is considerable, 10 to 1 or more being typical. In consequence rays striking the core wall at any appreciable distance from the aperture will be reflected onto the opposite wall of the cone. Successive reflections from the two walls will return the ray back through the lens. Thus only aberrated radiation relatively near the geometric image of the source is saved and hence the angular width of each radiation sensitive zone is not greatly increased by the cone. The effect of the cone is to make the zone angular width dependent on the ratio of aperture width to the lens aperture rather than to the lens focal length.

Radiation passing through the apertures 9 enters a reflective radiation cavity 10 which in this example is rectangular in section and is formed in the extruded body 1. All the cavity walls carry a reflecting layer R which may be specular but could have a scattering, but not absorbing, characteristic. A pyroelectric radiation detector is housed within the cavity and comprises a film 11 of pyroelectric plastics material supported by a frame 12 across the centre of the narrow dimension of the cavity. The frame 12 is also made reflective so that the film surface and the apertures 9 are the only radiation absorbing areas in the cavity, the film surface being much the larger in area. The two planar end faces 13 of the body are closed by planar reflecting surfaces, not shown, to complete the cavity 10 and to provide reflecting end walls to the cones.

The pyroelectric plastics material of the film is polyvinylidene fluoride (PVDF), though other pyroelectric polymers are known. The film is electrically poled during manufacture. A thin electrode layer is placed on both faces of the film, connections 14 and 15 to these layers being provided. The electrode layers may be blackened to increase radiation absorption. Alternatively, the layers may be semitransparent and the inherent high absorption of PVDF to thermal infrared radiation relied upon. As with other pyroelectric detectors, alternating output voltages are obtained when there are changes in the radiation from one or other of the sensitive zones. In a typical sensor the film is 25 microns thick and has an area 2 mm$\times$20 mm, the 2 mm dimension being the short dimension of the cavity and the cavity length in the extrusion direction being 20 mm. Such a detector film would have a Noise Equivalent Power (NEP) of $1.5\times10^{-9}$ $WHz^{-0.5}$ at 10 Hz, comparable to that of the Philips RPW100 (Trade Mark) pyroelectric detector.

PVDF has the relatively small dielectric constant of 12. Consequently the electrical capacitance between the electrode layers for a given area is relatively small. This might have increased the shot noise in the conventional JFET input amplifier which would be used. It is an advantage of the sensor in accordance with the invention that the film area is relatively large and hence restores the electrical capacitance to a value at which shot noise is not a problem.

The large film area in relation to the aperture 9 areas ensures high absorption at the detecting element. Also, if the reflectivity of the walls of the cavity is not as high as is theoretically possible, the radiation loss is offset to some extent by the larger area of the detector. In this connection, it is a virtue of the sensor that all the reflecting surfaces in the cones and in the cavity are within a sealed compartment, thereby excluding dust and condensation which would otherwise degrade the reflection coefficient.

The detector film may alternatively be arranged across the wide dimension of the cavity. It may also be formed integrally with the cavity or may form the bottom wall of the cavity.

The overall depth of the sensor is the cone length plus the cavity thickness. In the example the overall depth is less than 10 mm, affording a sensor of plate-like thickness which can be installed unobtrusively.

Figure 2:
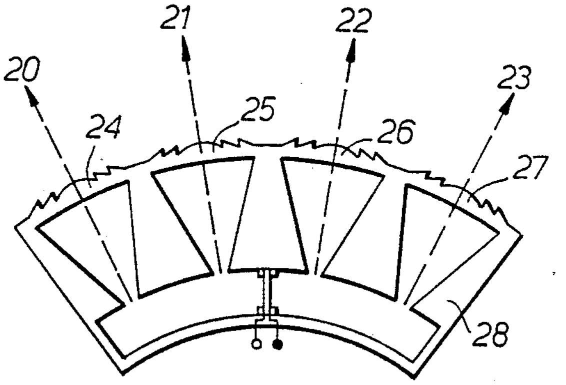
FIG. 2 shows a schematic sectional view of an arcuate form of an infrared sensor according to the invention.

FIG. 2 shows a section of a version of the sensor formed as a curved plate which might be installed around the top of a circular column in a building. The cones, the apertures, the cavity and the detector are all as described with reference to FIG. 1. The sensor body extrusion 28 is now formed into an arc. The directions 20, 21, 22 and 23 of the sensitive zones are now normal to their respective Fresnel lenses 24, 25, 26 and 27. Reflection losses are thereby minimised and the lens aberrations are only those associated with the wide aperture of each lens and its manufacturing errors.

From reading the present disclosure, other modifications will be apparent to persons skilled in the art. Such modifications may involve other features which are already known in the design, manufacture and use of infrared radiation sensors and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. An infrared radiation sensor comprising an optical system for gathering and concentrating infrared radiation from a source and a pyroelectric radiation detector for receiving the infrared radiation and generating an output signal, characterised in that the optical system comprises a lens arranged to feed source radiation through an aperture into a reflective radiation cavity, the lens and the aperture defining a radiation sensitive angular zone width and direction for the sensor, and in that the pyroelectric radiation detector comprises a film of pyroelectric plastics material within the cavity.

2. An infrared sensor as claimed in claim 1 characterised in that the optical system comprises an internally reflecting tapered cone, in that the lens is placed across the large end of the cone, and in that the small end of the cone forms the aperture into the cavity.

3. An infrared sensor as claimed in claim 1 characterised in that a plurality of optical systems are provided, and in that each optical system feeds source radiation through a respective aperture into the cavity.

4. An infrared sensor as claimed in claim 3 characterised in that the sensitive directions of the optical systems form an angularly dispersed fan of directions.

5. An infrared sensor as claimed in claim 2 characterised in that the tapered cone and cavity are formed as a length of an extrusion whereby the cone and cavity cross sections are constant throughout the extrusion length, in that the optical system is a cylindrical lens, the cylinder axis of the lens being parallel to the extrusion length, and in that the ends of the extrusion length are closed by reflecting material to complete the cavity.

6. An infrared sensor as claimed in claim 5 characterised in that the extrusion cross section is formed as an arc and in that each radiation sensitive direction is normal to the associated lens.

7. An infrared sensor as claimed in claim 5 characterised in that the cylindrical lens is a Fresnel lens.

* * * * *